No. 780,958. PATENTED JAN. 24, 1905.
F. C. PALMER.
WALL HOOK.
APPLICATION FILED JAN. 26, 1904.

Witnesses
Edgworth Greene
Bartlett J. Smith

Frederick C. Palmer, Inventor
By his Attorney William R. Baird

No. 780,958.

Patented January 24, 1905.

UNITED STATES PATENT OFFICE.

FREDERICK C. PALMER, OF BROOKLYN, NEW YORK.

WALL-HOOK.

SPECIFICATION forming part of Letters Patent No. 780,958, dated January 24, 1905.

Application filed January 26, 1904. Serial No. 190,750.

*To all whom it may concern:*

Be it known that I, FREDERICK C. PALMER, a citizen of the United States, and a resident of Brooklyn, in the county of Kings and State of New York, have invented certain new and useful Improvements in Wall-Hooks, of which the following is a specification.

My invention relates to wall-hooks; and its novelty consists in the construction and adaptation of the parts comprising the means for securing the hook in place.

The object of my invention is to provide a wall-hook which is adapted for divers purposes and at the same time may be held securely in place without danger of displacement under usual conditions.

Figure 1:
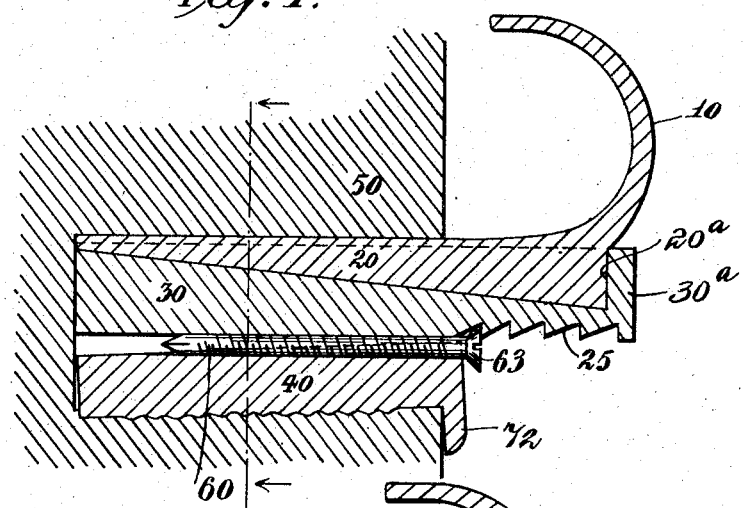
Figure 2:
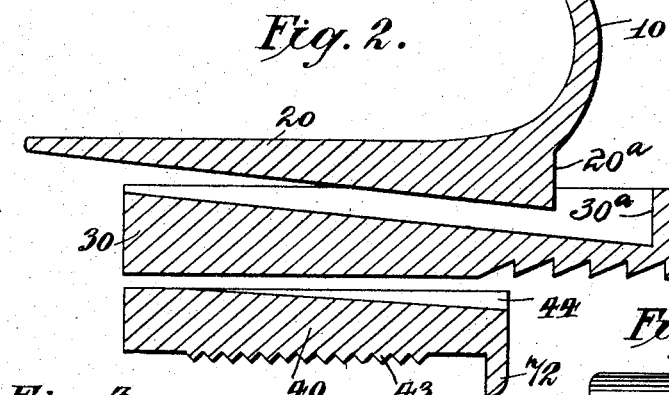
Figure 3:
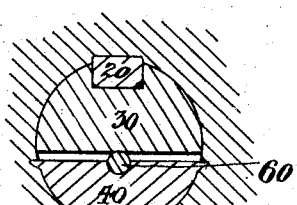
Figure 4:
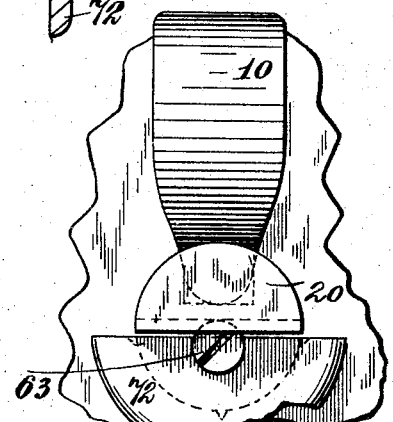

In the drawings, Figure 1 is a vertical section of a wall and an inserted wall-hook provided with my novel fastening means. Fig. 2 is a similar view of the parts before assembling and insertion in the wall. Fig. 3 is a transverse vertical section on the plane of the line 3 3 in Fig. 1. Fig. 4 is an end view of the parts shown in Fig. 1.

In the drawings, 10 is the wall-hook, made of any size, form, or material suitable for the purpose for which it is to be employed and provided with a shank 20, also varying to suit the circumstances of its use.

40 is a plug adapted partially to fill the aperture in the wall 50, into which the hook-shank is inserted, and provided with means presently to be described for holding the hook in place.

In the present form shown in Figs. 1, 2, 3, 4 the shank 20 is wedge-shaped, tapering toward the rear and provided near its outer end with a substantially vertical surface 20$^a$. The plug 40 is semicylindrical and is provided with external bosses or projections 43 to afford a better grip against the sides of the aperture in which it is to be placed. It is also provided with an upper centrally-placed groove 44, tapering toward its inner end, and with a dependent flange 72, provided with an inner smooth surface adapted closely to fit the outer surface of the wall to which the hook is to be secured. Intermediate the plug 40 and the shank 20 is a bar 30. This has a flat under surface, upwardly-sloping sides adapted to fit against the walls of the apertures, and an upper slot or depression adapted to receive the shank 20 of the hook 10. It is also provided with an upwardly-extending flange 30$^a$, adapted to fit snugly against the surface 20$^a$ of the hook-shank 20, and with downwardly-projecting indentations or corrugations 25.

After the parts are placed in position, as shown in Figs. 1, 2, and 3, a nail or screw 60, having a conical or laterally-spreading head 63, is driven along the groove 44 to press apart the plug 40 and bar 30, its head engaging the indentations 25 of the sleeve 30.

What I claim is—

1. Securing means for wall-hooks and like devices comprising a shank, a plug adapted to fill up partially the hole in which the shank is placed and a bar adapted to engage the hook-shank placed intermediate the said shank and the plug, and means for pressing apart the bar and plug after their insertion.

2. Securing means for wall-hooks and like devices comprising a shank, a plug adapted to fill up partially the hole in which the shank is placed and provided with a tapering groove, a bar adapted to engage the hook-shank placed intermediate the said shank and the plug, and means for pressing apart the bar and plug after their insertion, the latter comprising a nail adapted to be driven into the tapering groove in the plug.

3. Securing means for wall-hooks or like devices comprising a shank having a surface at substantially a right angle to its length, a bar having a recess to partially envelop said shank including said surface, and means for pressing the bar against the shank comprising a plug and wedge within the aperture in which the parts are placed.

4. Securing means for wall-hooks or like devices comprising a shank having a surface at substantially a right angle to its length, a bar having a recess to partially envelop said shank including said surface, and means for pressing the bar against the shank, comprising a plug adapted partially to fill the aperture in which the parts are placed, and means for pressing the plug and bar apart against the wall of said aperture.

5. Securing means for wall-hooks or like devices comprising a wedge-shaped shank, a bar adapted to partially envelop said shank to prevent its outward movement and means adapted to press the bar and shank tightly in place within a suitable aperture comprising a plug and means intermediate the same and the bar to press them apart and to lock said means against withdrawal.

6. Securing means for wall-hooks or like devices provided with a shank, a bar adapted to engage with and partially envelop the latter, a plug provided with a taper groove and shield and means for pressing apart the plug and bar, comprising a nail adapted to press against the latter and fit into the tapering groove in the former.

Witness my hand, this 20th day of January, 1904, at the city of New York, in the county and State of New York.

FREDERICK C. PALMER.

Witnesses:
    ESTELLE M. TITUS,
    B. J. SMITH.